(No Model.)
E. BOETTCHER.
SECONDARY BATTERY.
No. 277,445. Patented May 15, 1883.
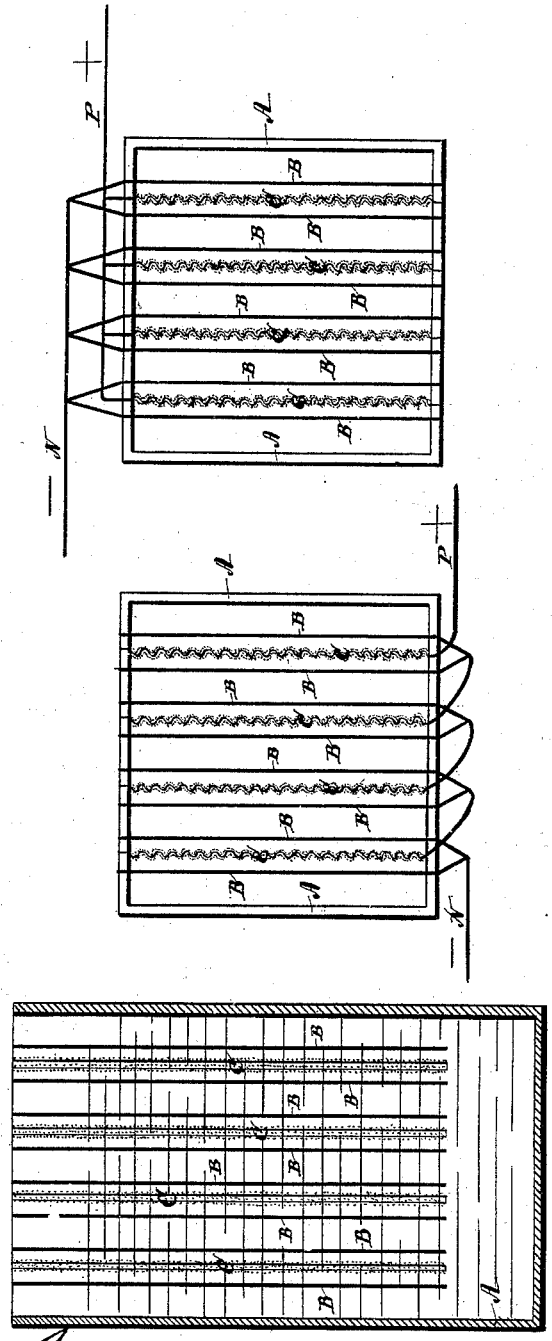
Witnesses.
Richard Nagle.
Inventor
Emil Boettcher
per Henry E. Roeder
attorney

UNITED STATES PATENT OFFICE.

EMIL BOETTCHER, OF LEIPSIC, GERMANY.

SECONDARY BATTERY.

SPECIFICATION forming part of Letters Patent No. 277,445, dated May 15, 1883.

Application filed May 1, 1882. (No model.)

*To all whom it may concern:*

Be it known that I, EMIL BOETTCHER, of the city of Leipsic, in the German Empire, have invented a new and Improved Secondary Battery, of which the following is a specification.

The nature of my invention consists in the construction of a secondary battery by combining anodes of thin corrugated lead-foil coated with a paste of pure litharge with positive and negative zinc plates placed on each side in a suitable vessel filled with acidulated water, whereby a powerful electro-motive force and great quantity of electricity are produced, while the battery is of very light weight.

In the accompanying drawings, Figure I represents a vertical section of my improved secondary battery. Fig. II is a top view, of the same when the batteries are arranged behind each other. Fig. III is a top view, showing the arrangement when the same are placed side by side.

A is the chamber, preferably made of hard rubber. B B are the zinc plates; C C, the anodes of thin lead-foil corrugated; P, the positive-wire and N the negative-wire connections.

A solution of chemically-pure sulphate of zinc (1.3 water) is electrolytically decomposed by means of a magneto-electric-induced current in such a way that zinc becomes composed on a very thin, pure sheet-zinc cathode. The liberated and remaining sulphuric acid in above mixture (1.10 water) does not act upon chemically-pure zinc, as has been proven by experiment and practice. For the anode, thin (0.05 millimeters) lead-foil is used, and for the purpose of enlarging its surface it is corrugated or folded in the direction from top to bottom. This lead-foil is dipped in a mixture of sulphate of zinc, as above, and pure litharge, (*Lithargyrum levigatum,*) made into a paste, thick enough to give the lead-foil a heavy coating of it. Oxygen will soon form a very thin covering of superoxide on this surface. By closing the circuit of a so-constructed battery or element the formerly-deposited zinc dissolves again and forms sulphate of zinc, while the hydrogen reduces the superoxide and part of the oxide of lead with which the lead-foil anode is coated into very fine metallic lead. By means of a regenerating-current zinc again deposits on the sheet-zinc, while the fine reduced particles of metallic lead on the anode become oxidized to superoxide. Several repetitions of this proceeding complete the secondary battery. It has a powerful electro-motive force of 2.2 Daniell, but can practically be used already, after the first decomposition has taken place, with an electromotive force of only 0.5 Daniell. Any charge given to this secondary battery will be completely obtained again. This battery is, in consequence of the thin material used, extremely light in weight, and can be constructed at trifling cost.

What I claim as my invention, and desire to secure by Letters Patent, is—

In a secondary battery, the anodes C, of thin corrugated lead-foil coated with a paste of pure litharge, (*Lithargyrum levigatum,*) in combination with zinc plates B, placed on each side in a suitable vessel, A, filled with acidulated water, substantially as and for the purpose set forth.

EMIL BOETTCHER.

Witnesses:
HERM. LEITERT,
GUSTAV REIRHEL.